COLOR TELEVISION SYSTEM

Filed July 9, 1952 4 Sheets-Sheet 1

INVENTOR.
Kurt Schlesinger
BY
Foorman L. Mueller
Atty.

INVENTOR.
Kurt Schlesinger
BY
Foorman L. Mueller
Atty

INVENTOR.
Kurt Schlesinger
BY
Norman L. Mueller
Atty.

INVENTOR.
Kurt Schlesinger
BY
Foorman L. Mueller
Atty.

United States Patent Office
2,735,886
Patented Feb. 21, 1956

2,735,886

COLOR TELEVISION SYSTEM

Kurt Schlesinger, Maywood, Ill., assignor to Motorola, Inc., Chicago, Ill., a corporation of Illinois Application July 9, 1952, Serial No. 297,963

6 Claims. (Cl. 178—5.2)

This invention relates to color television systems, and more particularly to such systems in which monochrome information is transmitted on a main carrier and color information is transmitted concurrently therewith as modulation components of one or more subcarriers.

In an effort to achieve compatibility with existing monochrome television systems, a color television system has been devised in which the various color video signals obtained from a suitable picture converting means are combined in a selected proportion to constitute a monocrome video signal which is combined with synchronizing components and modulated on a main carrier to form a monochrome television signal complying in all respects with present-day monochrome standards, and which may be reproduced in black-and-white in existing receivers. In order that the televised images may be reproduced in color at a color television receiver, the various color video signals are mixed with the monochrome signal at the transmitter to derive a series of "color-difference" video signals, the latter being modulated on suitable subcarriers, which in turn, are modulated on the main carrier and disseminated concurrently with the monochrome video signal to the color television receivers. Full details of this type of color television system may be found in the February 1952 edition of Electronics Magazine, published by the McGraw-Hill Corporation, in an article entitled "Principles of NTSC Compatible Color Television" by C. J. Hirsch et al., at page 88 of that publication.

As pointed out in the article referred to above, it is usual in a three-color television system to modulate the color difference signal (B—Y), corresponding to the difference between the blue video signal and the monochrome video signal, on a subcarrier having a reference phase and a selected frequency. In addition, the color difference signal (R—Y) corresponding to the difference between the red video signal and the monochrome video signal is modulated on a subcarrier having the aforesaid selected frequency but having a phase in phase quadrature with the reference phase of the (B—Y) color difference signal subcarrier. It is only necessary to send the two previously mentioned color difference signals with the television signal, since the green color difference signal may be reconstituted at the receiver by a comparison of the other two, as is well known.

It is desirable to establish the color subcarrier at a relatively high frequency (for example at approximately 3.9 megacycles) to reduce its visibility in black-and-white receivers. This limits the frequency range over which upper-side band transmission may be used for the color subcarrier components, however, the lower side bands may extend for a considerable range. These unequal side bands result in cross talk, which may be effectively neutralized by reversing the phase of the (R—Y) subcarrier after every field at the transmitter, and simultaneously making the corresponding change in the receiver demodulators.

It is usual practice to suppress the subcarrier frequency and to recover the various modulation components at the receiver by deriving thereat various control signals having the appropriate phase and frequency so that the side band information may be recovered. Since the (R—Y) subcarrier is inverted in phase at the transmitter at the end of each field, it is necessary that the demodulating signal developed at the receiver be similarly inverted in phase at the proper times so that it may perform properly its demodulating function.

Systems are known to the art in which line bursts of signal having a phase and frequency related to the color subcarriers are transmitted on the line blanking pulses and utilized to reconstitute the various subcarriers at the receiver. Systems are also known in which the field synchronizing pulses are used at the receiver to produce an appropriate signal that may be used for inverting at the proper times the control signal derived from the aforementioned bursts which is to be used to demodulate the (R—Y) color-difference signal. Systems using the field synchronizing pulses to achieve the aforedescribed phase inversion of the control signal for demodulating the (R—Y) color-difference signal are generally acceptable but suffer from a disadvantage in that they are relatively susceptible to noise and other interference. Moreover, such arrangements require a relatively complicated circuit involving an undue number of elements and components.

It is an object of the present invention to provide an improved color television system in which the above-mentioned disadvantages of the prior art are overcome.

A further object of the invention is to provide an improved color television system of the type in which color-difference signals are transmitted in a television signal as modulation components of one or more suitable subcarriers, and in which the color-difference signals are recovered at a receiver in a new and improved fashion.

Another object of the invention is to provide a color television system in which sufficient information is included in the television signal to enable the receiver to derive appropriate control signals for demodulating the color-difference signal sub-carriers in an improved fashion and without the need of unduly complicated circuits and instrumentalities at the receivers.

Another object of the invention is to provide improved apparatus in a color television receiver for identifying the alternate fields of a received color television signal and for recovering color-difference signals received as modulation components of one or more subcarriers included in the television signal.

A feature of the invention is the provision in the color television signal of a series of signal bursts during field retrace intervals whose phase is inverted, during alternate field retrace intervals, and the provision in a color television receiver of improved apparatus for utilizing the signal bursts to produce a sub-carrier wave of proper frequency and of a selected phase which is inverted at the end of each field trace interval, the subcarrier wave being utilized to demodulate color information contained in the color television signal.

Another feature of the invention is the provision in the color television signal of a signal burst during each line retrace interval having a selected frequency and phase, and of a further series of signal bursts during field retrace intervals having an inverted phase during alternate field retrace intervals; and the provision in a color television receiver of improved apparatus for using the line-retrace signal bursts for deriving a reference subcarrier wave for recovering color information contained in the color television signal, and for using the field-retrace bursts and the reference subcarrier wave for deriving a second subcarrier wave for recovering further color information contained in the color television signal.

The above and other features of the invention which are believed to be new are set forth with particularity in the appended claims. The invention itself, however, together with further objects and advantages thereof, may best be understood by reference to the following description when taken in conjunction with the accompanying drawings in which:

In accordance with the present invention the color television signal includes, in addition to the bursts of signal impressed on the line blanking pulses for establishing a reference color subcarrier wave, further bursts of signal impressed on each field blanking pulse in the spaces between the equalizer pulses following the serrated field synchronizing pulse. The latter bursts have the same frequency and are in phase quadrature with the reference subcarrier bursts, and the phase thereof is inverted from one field-retrace interval to the other.

The reference or line bursts are selected at the receiver and used to phase a continuous-wave restorer which develops a continuous reference color subcarrier wave. This is used directly for recovering one of the color-difference signals. The field bursts are selected at the receiver and compared with the aforesaid reference color subcarrier wave to identify the alternate fields of the picture.

The color reference wave is then converted to waves in phase quadrature with the reference wave, with the desired waves alternatively leading and lagging the reference wave, in alternate fields. That is, the derived waves are of inverted phase in alternate fields. These derived waves are used to demodulate the second color-difference signal which also is inverted in alternate fields as previously described.

Figures 1A, 1B:
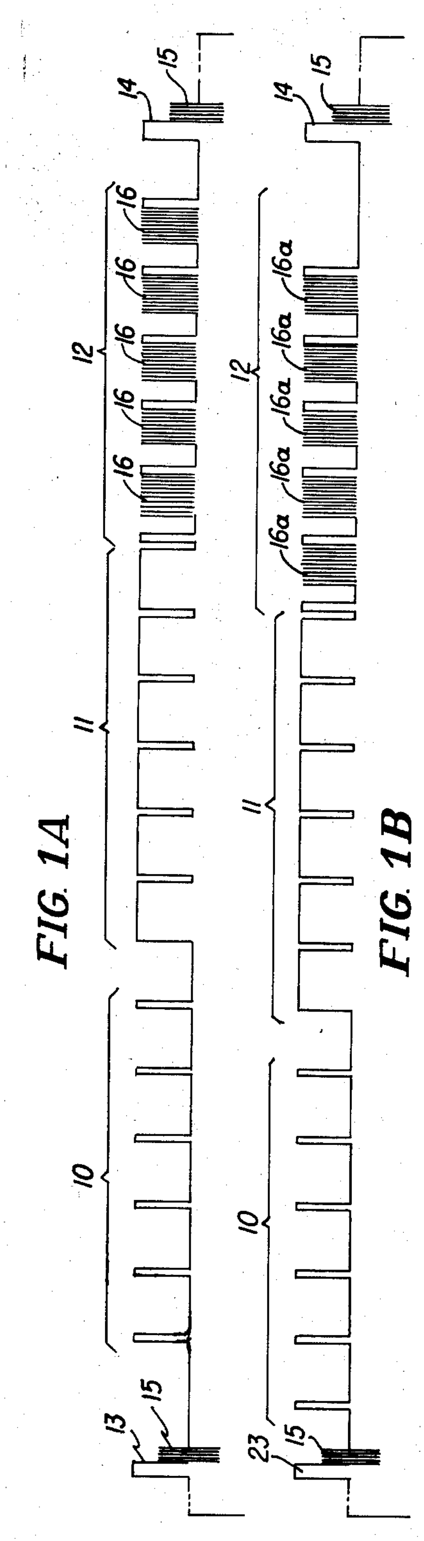
Figs. 1A and 1B show various wave forms useful in understanding the invention.

Fig. 1A shows a portion of the color television signal used in the present system occuring during an even field-retrace interval, and Fig. 1B shows a portion of the color television signal occuring during an odd field-retrace interval. In accordance with present day standards, the television signal includes in each field-retrace interval a group of equalizing pulses 10, a serrated field-synchronizing pulse 11, a further group of equalizing pulses 12, and line-synchronizing pulses such as 13 and 14, all pedestalled on a field-blanking pulse.

In existing systems, line bursts 15 are included in the signal immediately after the line-synchronizing pulses which occur during the field-retrace interval, and also on the line-blanking pulses during the field-trace intervals. These bursts have a frequency and phase corresponding to the subcarrier of the (R—Y) color difference signal, having a phase in phase quadrature with the phase of the (B—Y) color difference signal which will be considered "reference" for purposes of the present explanation. In accordance with the present invention, further bursts 16 are impressed on the even field-blanking pulses immediately preceding each of the equalizing pulses of group 12. The bursts 16 have a frequency and phase corresponding to the (B—Y) subcarrier, which is at reference phase. Further bursts **16*a* are impressed on the odd field-blanking pulses (Fig. 1B) immediately preceding the equalizing pulses of group 12, these latter bursts having the same frequency as the bursts 16** but being inverted in phase.

Figure 2:
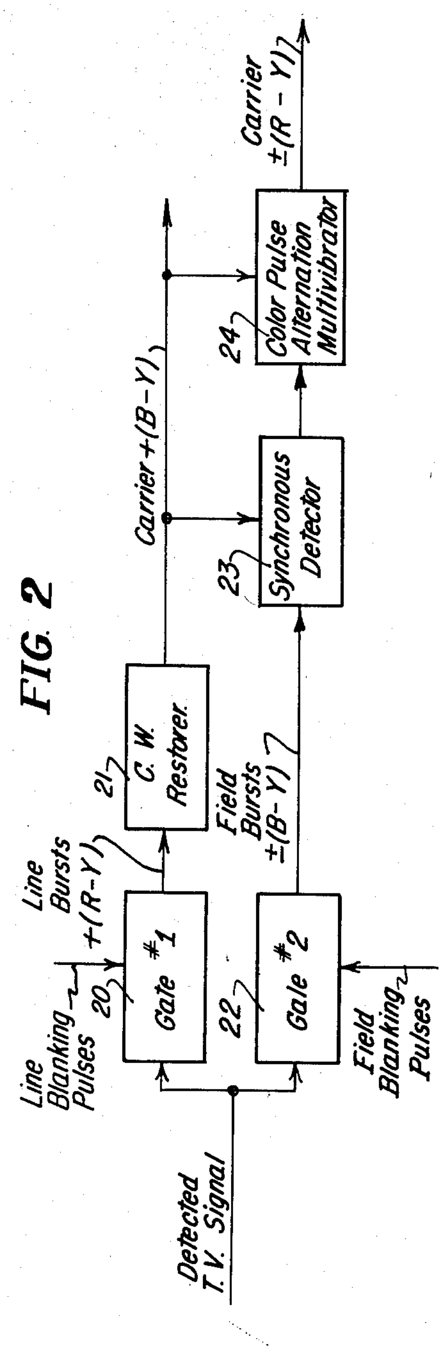
Fig. 2 shows schematically certain components of a television receiver incorporating the invention.

As shown in Fig. 2, the received television signal is impressed on a gate 20 conjointly with line blanking pulses to derive the line bursts 15 corresponding in frequency and phase to the (R—Y) subcarrier. The bursts 16 and **16*a* are spaced from the preceding equalizing pulses, as shown in Figs. 1A and 1B, so that actuation of gate 20 during field-retrace does not cause translation of the latter bursts by this gate. The line bursts are impressed on a continuous wave restorer 21 which is synchronized as to frequency and phase thereby to produce a reference subcarrier wave which, due to a 90° phase shift in the restorer, has a frequency and phase corresponding to the (B—Y) subcarrier and which may be used to demodulate the (B—Y) color difference signal. The television signal is also impressed on a gate 22 conjointly with field blanking pulses to derive the field bursts 16 and 16*a*. As previously noted, the latter bursts correspond in frequency and phase to the +(B—Y) subcarrier during even field field retrace intervals, and correspond to the −(B—Y) subcarrier during odd field field retrace intervals. The bursts from gate 22 are supplied to a synchronous detector 23 in which they are compared with the (B—Y) subcarrier obtained from restorer 21 so that a control signal having maximum amplitude during even field retrace intervals and minimum amplitude during odd field retrace intervals is produced by the detector. The latter signal is used to actuate a color-phase-alternation multi-vibrator 24 from a first operation condition to a second operation condition. The reference subcarrier from restorer 21 is also supplied to multi-vibrator 24**, and when the multi-vibrator is in a first operating condition it translates the (B—Y) subcarrier from the restorer with a 90° phase shift to produce a second subcarrier having a frequency and phase corresponding to the +(R—Y) subcarrier. However, when the multi-vibrator is in its second operative condition it produces a subcarrier having a frequency and phase corresponding to the −(R—Y) subcarrier.

In the above manner, restorer 21 produces a reference subcarrier which can be used to demodulate the modulation of (B—Y) subcarrier which is maintained at the selected frequency and reference phase. Moreover, the subcarrier from multi-vibrator 24 may be utilized to demodulate the modulation of the (R—Y) subcarrier which is maintained at the selected frequency and in phase quadrature with the reference phase and which is inverted at field-retrace intervals in correspondence with the phase inversions of the subcarrier from multi-vibrator 24.

Figure 3:
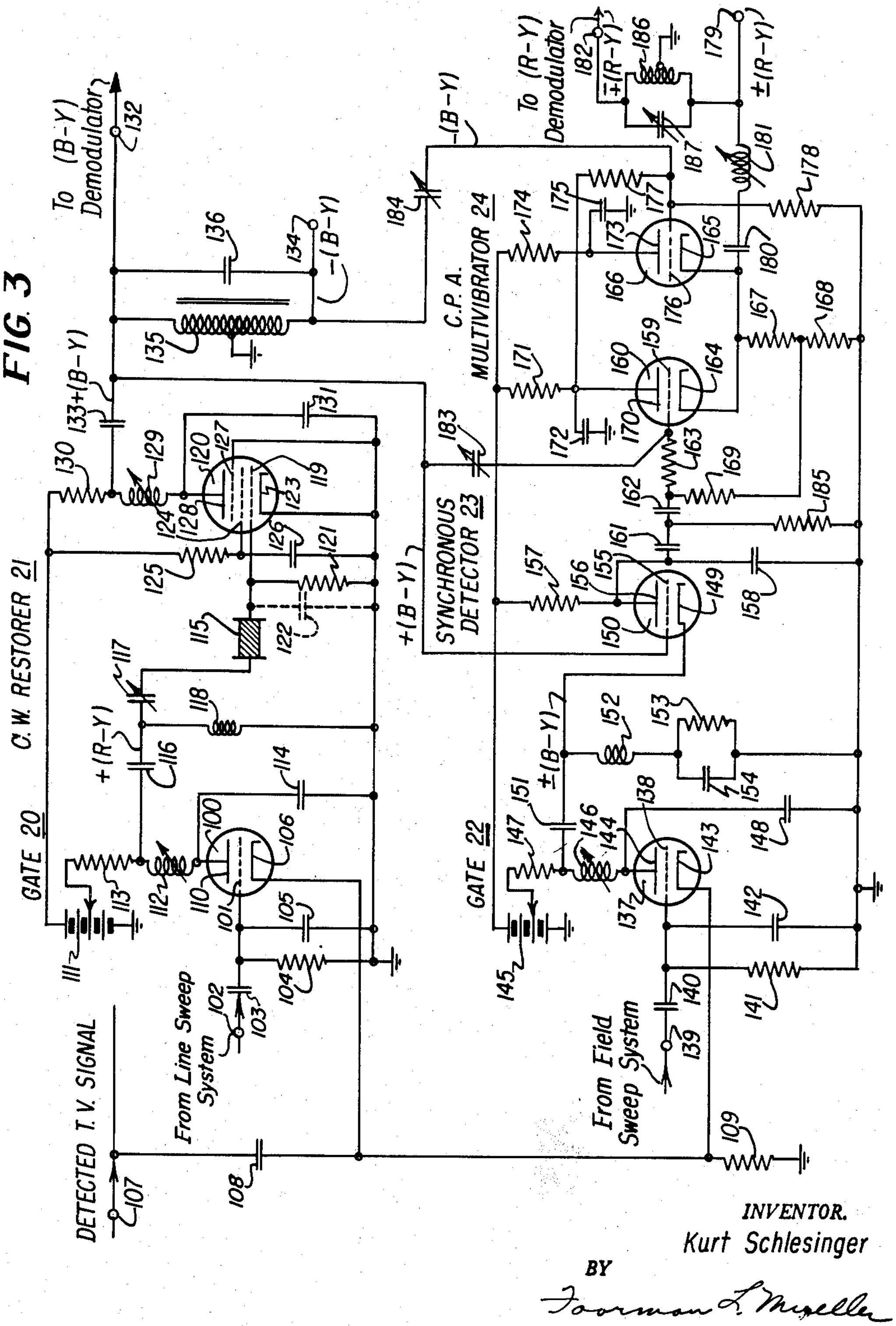
Fig. 3 is a circuit diagram of the components of Fig. 2.

Fig. 3 shows a suitable circuit diagram of components shown schematically in Fig. 2. Gate 20 includes a triode 100 having a control electrode 101 connected to an input terminal 102 through a coupling capacitor 103, the control electrode being connected to ground through a resistor 104 shunted by a by-pass capacitor 105. The cathode 106 of device 100 is coupled to an input terminal 107 through a coupling capacitor 108, and is connected to ground through a resistor 109. The anode 110 of device 100 is connected to an intermediate positive terminal of a source of unidirectional potential 111 through a variable inductance coil 112 and series resistor 113. The anode is coupled to ground through a by-pass capacitor 114, and the junction of elements 112 and 113 is coupled to a crystal 115 through series-connected capacitors 116 and 117, the junction of the last mentioned capacitors being connected to ground through an inductance coil 118.

Crystal 115 is connected to the control electrode 119 of an amplitude limiter discharge device 120, the control electrode being connected to ground through a grid leak resistor 121 shunted by a small capacitance 122 which may be the stray input capacity of the grid circuit. The cathode 123 of device 120 is connected to ground, and the screen electrode 124 is connected to the positive terminal 111 through a resistor 125 and by-passed to ground through a capacitor 126. The suppressor electrode 127 of device 120 is connected to ground, and the anode 128 of that device is connected to the positive terminal of source 111 through a variable inductance 129 and series resistor 130. Anode 128 is coupled to ground through a by-pass capacitor 131, and the junction of elements 129 and 130 is coupled to an output terminal 132 through a capacitor 133. Output terminal 132 is coupled to a further output terminal 134 through a phase inverting network comprising a center tapped inductance coil 135 shunted by a capacitor 136, the center tap of coil 135 being grounded.

A detected television signal including the previously referred to line and field signal bursts such as shown in Figs. 1A and 1B is impressed with negative polarity on input terminal 107 and, therefore, on cathode 106 of device 100. Line blanking pulses which may conveniently be derived from the line sweep system of the receiver are concurrently applied with positive polarity to input terminal 102 and, thence, to control electrode 101. Elements 112, 118 and 114 in the anode circuit of device 100 constitute a resonant circuit which is tuned to the frequency of the line bursts 15 of Figs. 1A and 1B. Device 100 is rendered conductive by the joint action of the blanking pulses applied to terminals 102 and the television signal applied to terminals 107 so that the tuned circuit 112, 118, 114 selects these bursts and applies them to crystal 115, coil 118 constituting a low impedance drive for the crystal. As previously pointed out, these bursts have a frequency and phase corresponding to the (R—Y) subcarrier.

Crystal 115 has a fundamental frequency corresponding to the subcarrier frequency, and is excited by the bursts from the aforementioned tuned circuit so that it generates a signal having a frequency and phase corresponding to the (R—Y) subcarrier. It has been found with the illustrated circuit arrangement of crystal 115 that optimum amplitude signal is obtained in the grid circuit of device 120 at a 90° phase shift so that device 120 translates efficiently a continuous wave signal corresponding in frequency and phase to the (B—Y) subcarrier. Inductance coil 129 and capacitor 131 constitute a resonant circuit which is tuned to the frequency of the subcarrier so that a continuous wave corresponding to the (B—Y) subcarrier is impressed on phase inverting circuit 135, 136. In this manner, a continuous wave corresponding to the +(B—Y) subcarrier is supplied to output terminal 132, whereas a continuous wave corresponding to the —(B—Y) subcarrier is supplied to output terminal 134. When a single ended demodulator is utilized in the receiver, only the signal from terminal 132 is required. However, it is often desirable to use a balanced demodulator which requires the signals from terminals 132 and 134 to demodulate the (B—Y) subcarrier.

Gate 22 includes a triode 137 having a control electrode 138 coupled to an input terminal 139 through a coupling capacitor 140, the control electrode being connected to ground to a grid leak resistor 141 shunted by a capacitor 142. The cathode 143 of triode 137 is connected to cathode 106 of triode 100, and the anode 144 of this device is connected to an intermediate positive terminal of a source of unidirectional potential 145 through a variable inductance coil 146 and series resistor 147. Anode 144 is by-passed to ground through a capacitor 148, and the junction of elements 146 and 147 is coupled to the cathode 149 of a triode electron discharge device 150 through a coupling capacitor 151. Cathode 149 is connected to ground through an inductance coil 152 and a biasing resistor 153 shunted by a capacitor 154.

The control electrode 155 of device 150 is connected to output terminal 132 to derive the (B—Y) subcarrier, and the anode 156 is connected to positive source 145 through a resistor 157. The anode is by-passed to ground through a capacitor 158 and is coupled to the control electrode 159 of an electron discharge device 160 through series connected capacitors 161, 162 and through a limiting resistor 163. The junction of capacitors 161 and 162 is connected to ground through a resistor 185. The cathode 164 of device 160 is connected to the cathode 165 of an electron discharge device 166, and these cathodes are connected to ground through a pair of series resistors 167 and 168. The junction of elements 162 and 163 is connected to the junction of resistors 167 and 168 through a resistor 169. The anode 170 of device 160 is connected to the positive terminal of source 145 through a resistor 171 and is by-passed to ground through a capacitor 172. The anode 173 of device 166 is connected to the positive terminal of source 145 through a resistor 174 and is by-passed to ground through a capacitor 175. Anode 170 is further connected to the control electrode 176 of device 166 through a resistor 177, the control electrode being connected to ground through a resistor 178. Cathodes 164 and 165 are coupled to an output terminal 179 through a capacitor 180 and series connected variable inductance coil 181. Terminal 179 is coupled to a further output terminal 182 through a phase inverting network and comprising inductance coil 186 whose center tap is connected to ground and which is shunted by a variable capacitor 187. The +(B—Y) subcarrier is supplied to control electrode 159 through a capacitor 183 and the negative (B—Y) subcarrier is supplied to control electrode 176 through a capacitor 184.

Appropriate blanking pulses may be derived from the field sweep system, or by other means in a manner to be described, to embrace those portions of the field retrace intervals which contain the bursts 16 and 16*a* of Figs. 1A and 1B, and these gating pulses are applied to input terminal 139, and therefore, to control electrode 138 of device 137 with positive polarity. The detected television signal from input terminal 107 is applied with negative polarity to cathode 143. Elements 146, 148 and 152 constitute a resonant circuit which is tuned to the frequency of these bursts to select these bursts and apply them to cathode 149 of device 150 which constitutes synchronous detector 23. The arrangement of inductance coils 146 and 152 provides the proper impedance for driving the cathode 149, and device 151 is appropriately biased by network 153 and 154. In this manner, +(B—Y) signal bursts are applied to cathode 149 during each even field retrace interval and —(B—Y) signal bursts are supplied to the cathode during odd field retrace interval. As previously stated, the +(B—Y) subcarrier is applied to control electrode 155 so that the synchronous detector develops a signal having maximum amplitude for the +(B—Y) bursts and minimum amplitude for the negative (B—Y) bursts. Resistor 157 and capacitor 158 function as a noise filter so that a control signal which is noise free is developed by the detector. The control signal is differentiated by network 161, 185 amplitude limited by resistor 163, and supplied to control electrode 159 of device 160; the control signal having maximum amplitude during even field retrace and minimum amplitude during odd field retrace.

Devices 160 and 166 constitute the color phase alternation multivibrator 24 and are cross-connected so that the maximum amplitude portion of the control signal applied to control electrode 159 triggers the multivibrator to a condition in which device 160 is conductive and 166 non-conductive, whereas the minimum amplitude portion of the control signal returns the multivibrator to a condition in which device 160 is non-conductive and device 166 is conductive. Devices 160 and 166 also function to translate the +(B—Y) and —(B—Y) subcarriers from terminals 132 and 134 to output terminals 179 and 182. When device 160 is conductive the +(B—Y) subcarrier is translated to output terminals 179 and 182, and when device 166 is conductive, the —(B—Y) subcarrier is translated to this output terminal. Network 186, 187 inverts the polarity of the signal appearing at terminal 179 so that when the plus carrier appears at the terminal 179, a negative carrier appears at terminal 182, and vice versa. Capacitors 183 and 184 may be adjusted so that the amplitude of the resulting signals at terminals 179 and 182 is the same for both conductive conditions of the multivibrator to prevent color flicker. Inductance coil 181 is adjusted to a point in which a 90° phase variation occurs to the ±(B—Y) subcarrier as it is translated through the multivibrator circuit so that a ∓(R—Y) signal is obtained at output terminal 179 and a ±(R—Y) subcarrier signal is obtained at terminal 182 through phase inverter circuit 186, 187. As in the case of the (B—Y) subcarrier, one or both of these subcarriers from terminals 179 and 182 may be utilized at the (R—Y) demodulator for recovering the (R—Y) information.

Merely by way of illustration, the following is a list of the values that may be used for the various circuit elements of the arrangement of Figure 4:

| | |
|---|---|
| Capacitor **108** | 100 micromicrofarads. |
| Capacitor **103** | .01 microfarad. |
| Capacitor **105** | 500 micromicrofarads. |
| Capacitor **114** | 10 micromicrofarads. |
| Capacitor **116** | .01 microfarad. |
| Capacitor **117** | 5–20 micromicrofarads. |
| Capacitor **122** | 10 micromicrofarads. |
| Capacitor **133** | .01 microfarad. |
| Capacitor **131** | 10 micromicrofarads. |
| Capacitor **140** | .1 microfarad. |
| Capacitor **142** | 500 micromicrofarads. |
| Capacitor **148** | 10 micromicrofarads. |
| Capacitor **154** | 10 microfarads. |
| Capacitor **158** | .0033 microfarad. |
| Capacitor **161** | .01 microfarad. |
| Capacitor **162** | .02 microfarad. |
| Capacitor **172** | 100 micromicrofarads. |
| Capacitor **183** | 5–20 micromicrofarads. |
| Capacitor **184** | 5–20 micromicrofarads. |
| Capacitor **175** | 100 micromicrofarads. |
| Capacitor **180** | 500 micromicrofarads. |
| Resistor **104** | 2.2 Megs. |
| Resistor **109** | 2.2 K. |
| Resistor **113** | 4.7 K. |
| Resistor **121** | 1 Meg. |
| Resistor **130** | 10 K. |
| Resistor **141** | 2.2 Megs. |
| Resistor **153** | 2.2 K. |
| Resistor **157** | 150 K. |
| Resistor **185** | 47 K. |
| Inductance **112** | 30 micro H. |
| Inductance **118** | 5.6 micro H. |
| Inductance **129** | 50 micro H. |
| Inductance **146** | 30 micro H. |
| Inductance **152** | 5.6 micro H. |
| Inductance **181** | 30 micro H. |

Figures 3A, 4A, 4B, 4C, 7A, 7B:
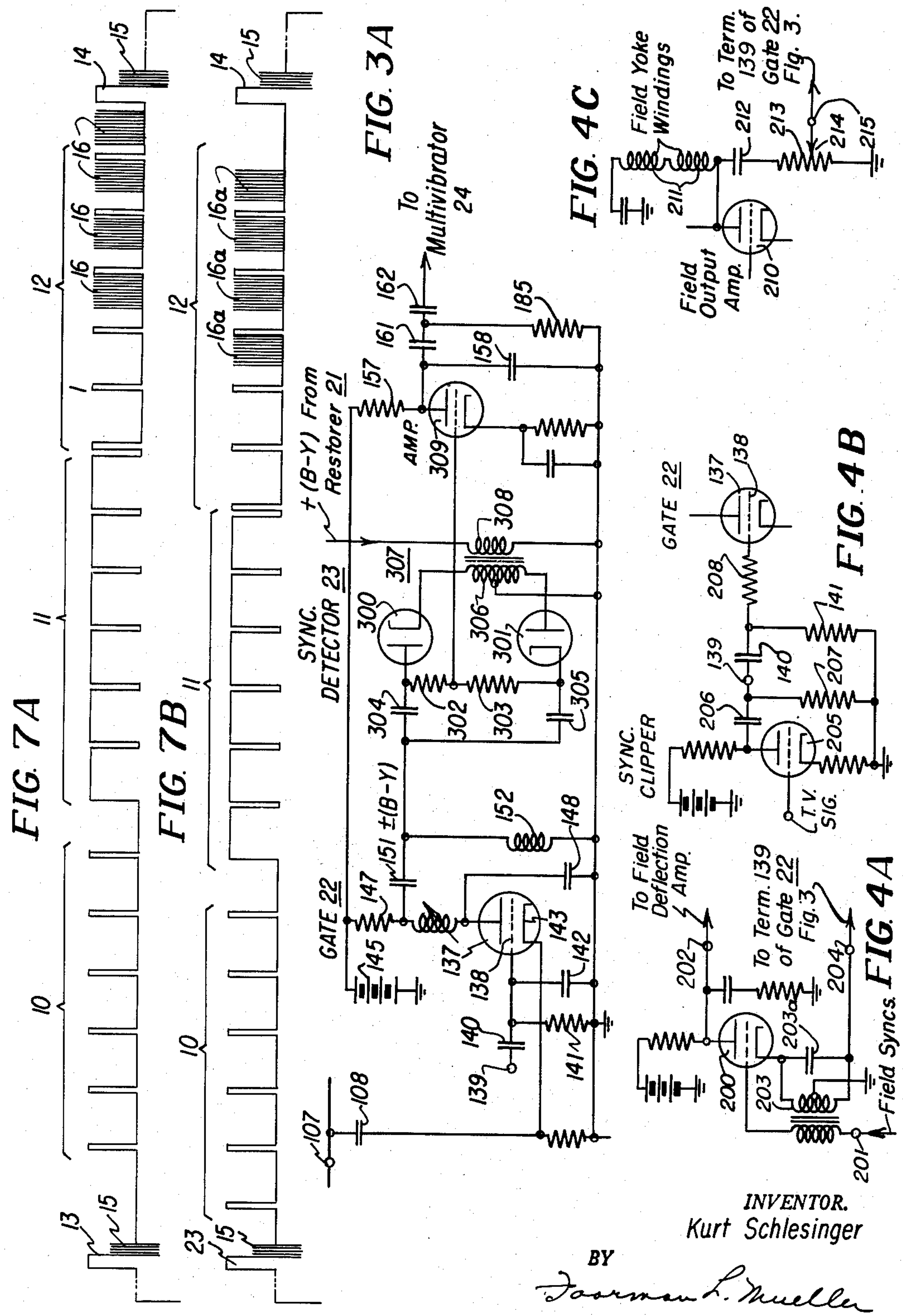
Fig. 3A is a modification of a portion of the circuit of Fig. 3.
Figs. 4A, 4B and 4C show three convenient circuits for deriving gating signals used in the system.
Figs. 7A and 7B show modified wave forms that may be utilized in the system of the present invention.

Increased noise immunity and more positive control of multivibrator 24 may be achieved when the circuit of Fig. 3 is modified as shown in Fig. 3A. In the modification, the output circuit of gate 22 is connected to a balanced detector circuit including diodes 300 and 301. The anode of diode 300 is connected to the cathode of diode 301 through series resistors 302 and 303. The junction of elements 151 and 152 is coupled to the anode of device 300 through a capacitor 304 and to the cathode of device 301 through a capacitor 305. The cathode of diode 300 is connected to the anode of diode 301 through winding 306 of a transformer 307, the center-tap of winding 306 being grounded. The winding 308 of transformer 307 has one side connected to ground and the other to restorer 21 of Fig. 3 to derive the (B—Y) carrier. The junction of resistors 302, 303 is connected to the control electrode of a discharge device 309 which functions as an amplifier. The output electrode of the amplifier is coupled to multivibrator 24 in a similar manner as the coupling of detector 23 in Fig. 3.

The ±(B—Y) bursts derived from gate 22 are applied respectively to the anode of diode 300 and to the cathode of diode 301. At the same time, the (B—Y) carrier from restorer 21 is applied with negative polarity to the cathode of diode 300 and with positive polarity to the anode of diode 301. Each +(B—Y) burst from gate 22 causes device 300 to conduct and a negative polarity signal is supplied to the control electrode of device 309. On the other hand, each —(B—Y) bursts causes device 301 to conduct so that a positive signal is applied to the control electrode of device 309. These positive and negative signals are amplified by device 309 and used to control multivibrator 24. As in the embodiment of Fig. 3, resistor 157 and capacitor 158 serves as a noise filter, and the control signal is differentiated by the network 161, 185 before it is applied to the multivibrator.

Figs. 4A, 4B and 4C show three convenient sources for the gating signal for the field bursts which is supplied to input terminals 139 of the circuit of Fig. 3. In Fig. 4A, electron discharge device 200 is connected to form a blocking oscillator circuit which responds to field synchronizing pulses applied to terminal 201 to generate a deflection signal synchronized with the field synchronizing pulses. The latter signal is supplied to output terminal 202 and, thence, to the field deflection amplifier of the receiver. The blocking oscillator transformer has a winding 203 in the cathode circuit of device 200 with a grounded center-tap, and the gating signal for gate 22 is derived at the bottom of this winding and is supplied to terminal 204. Winding 203 is shunted by a capacitor **203*a* which determines the width of the gating signal, and the gating signal has a positive peak occurring after the termination of each field synchronizing pulse applied to terminals 201, and in time coincidence with the bursts 16 and 16*a* of Figs. 1A and 1B so that this signal may be used to actuate gate 22**.

When so desired the synchronizing pulses may be used directly to derive a gating signal for gate 22 in the manner shown in Fig. 4B. In the latter figure, device 205 is connected to constitute a usual synchronizing signal clipper circuit and the anode of this device is coupled to input terminal 139 of gate 22 through a capacitor 206, the side of capacitor 206 remote from the anode being connected to ground through a resistor 207. In addition, a limiting resistor 208 is included in the connection to control electrode 138 of gate discharge device 137. Field synchronizing pulses from clipper 205 are differentiated in network 206, 207 to derive a positive gating signal occurring in time coincidence with bursts 16 and **16*a* of Figs. 1A and 1B, resistor 208** serving to limit the amplitude of the gating signal to the desired level.

In the arrangement of Fig. 4C the field deflection output amplifier 210 of the television receiver is directly coupled to the field yoke winding 211 in known fashion, the anode of amplifier 210 being coupled to ground through series connected capacitor 212 and resistor 213. Resistor 213 has a variable tap 214 connected to output terminal 215. A positive high voltage pulse is developed across resistor 213 during each field retrace at the termination of the field synchronizing pulse in time coincidence with bursts 16 and **16*a* of Figs. 1A and 1B. This pulse is derived with selected amplitude at tap 214 and supplied to output terminal 215 for utilization as a gating signal by gate 22** of Fig. 3.

Figures 5, 6:
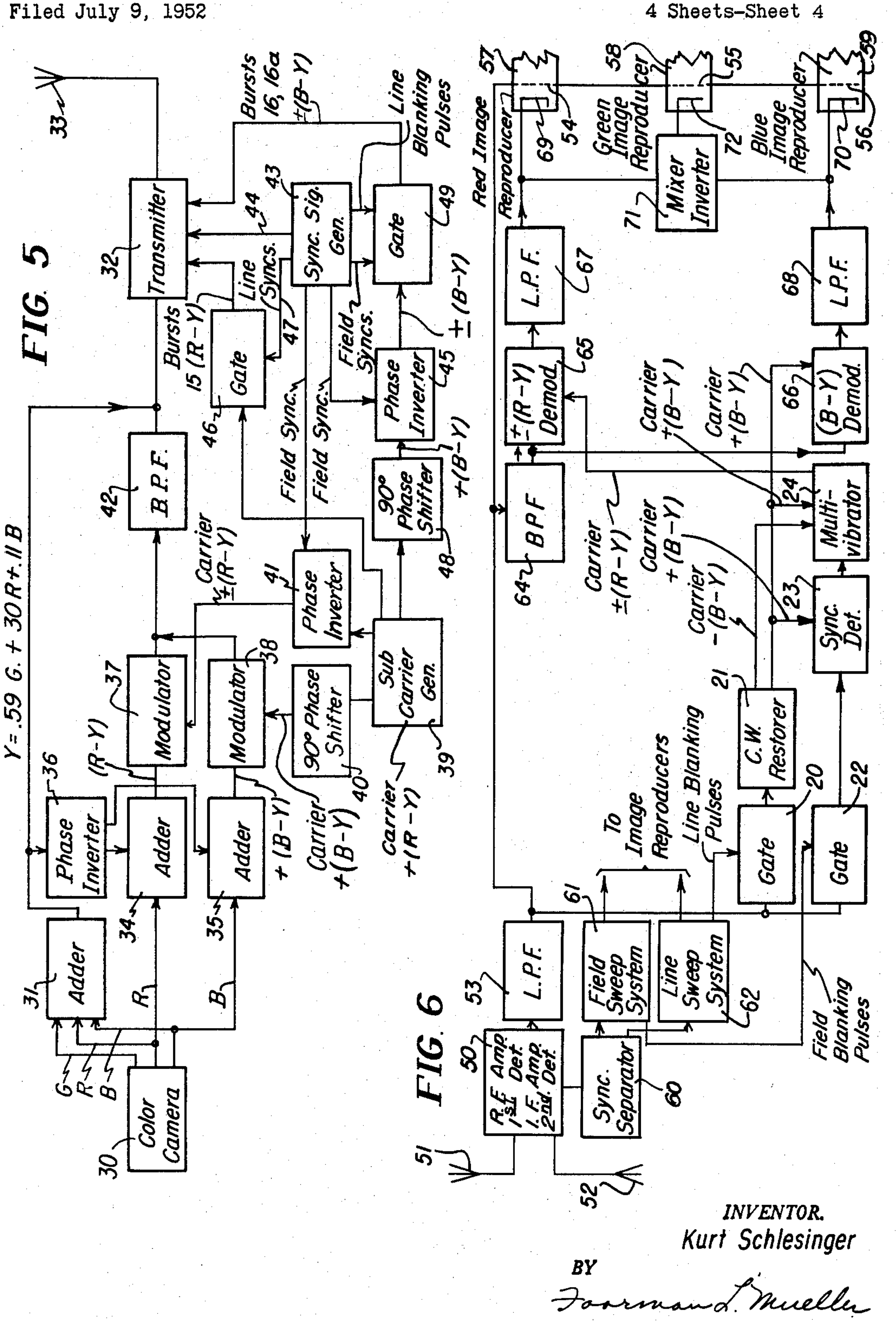
Fig. 5 shows a complete transmitter for producing the color television signal utilized in the present system.
Fig. 6 shows a complete receiver incorporating the principles of the invention.

The transmitter of Fig. 5 includes a color camera 30 which may be any well-known type of picture-converting device for developing three color video signals G, R and B corresponding respectively to the various color characteristics of the scene to be televised. Camera 30 is connected to an adder circuit 31 which is connected to a transmitter unit 32, the transmitter unit including the usual circuits for generating a main carrier wave and for modulating the video and synchronizing information thereon, as well as the usual amplifier and other well-known stages. The output terminals of transmitter 32 are connected to an appropriate antenna 33. The R lead of camera 30 is connected to an adder circuit 34, and the B lead from the camera is connected to an adder 35. The output terminal of adder 31 is connected through a phase inverter 36 to adders 34 and 35. The output terminals of adders 34 and 35 are connected respectively to modulators 37 and 38.

The transmitter includes a sub-carrier generator 39 which produces a sub-carrier signal of a selected frequency and phase. Generator 39 is coupled to modulator 38 and through a 90° phase shifter 40, and is coupled to modulator 37 through a keyed phase inverter 41. Modulators 37 and 38 are coupled through a band-pass filter 42 to transmitter unit 32.

The transmitter also includes usual synchronizing signal generators 43 which develop line- and field-synchronizing pulses, equalizing pulses and associated blanking pedestals. Generator 43 supplies the various synchronizing and pedestal components to transmitter unit 32 over a lead 44, supplies field-synchronizing pulses to inverter 41, and supplies line-blanking pulses to a gate circuit 46 over a lead 47. Gate circuit 46 is interposed between generator 39 and transmitter unit 32. The output terminals of generator 39 are also connected through a 90° phase shifter 48, and through a keyed phase inverter 45 and gate 49 to transmitter unit 32. Generator 43 supplies field synchronizing pulses to units 45 and 49 and additionally supplies line blanking pulses to unit 49.

The color video signals developed by camera 30 are combined in a selected proportion in adder 31 to produce a monochrome video signal Y which, for example, is equal to .59G+.30R+.11B. The monochrome signal Y is supplied to transmitter 32 in which it is modulated on the main carrier together with the synchronizing information from unit 43 for radiation from antenna 33. The R video signal from camera 30 is supplied to adder 34 in which it is mixed with the —Y signal from phase inverter 36 to produce the (R—Y) color difference signal. Likewise the B signal from camera 30 is supplied to adder 35 to obtain the (B—Y) color difference signal.

The (B—Y) color difference signal is modulated in modulator 38 on the subcarrier derived from phase shifter 40, the subcarrier having the select frequency but in phase quadrature with the phase of the subcarrier from generator 39. The (R—Y) color difference signal is modulated in modulator 37 on the subcarrier from inverter 41, the latter subcarrier having the selected frequency and phase of the subcarrier from generator 39 but being phase inverted during alternate field retrace intervals due to the action of the field synchronizing pulses derived from generator 43, the phase inversion of the (R—Y) subcarrier being made for the reasons previously discussed.

The (R—Y) subcarrier from generator 39 is phase shifted 90° in phase shifter 48 to produce a carrier corresponding to the (B—Y) subcarrier applied to modulator 38. The (B—Y) carrier from unit 48 is phase inverted during each field retrace interval by phase inverter 45 responding to the field synchronizing pulses applied thereto, and the latter unit produces a signal corresponding to the ±(B—Y) subcarrier. The latter signal is applied to gate 49 which responds and differentiates applied field synchronizing pulses to derive a gating signal corresponding in time to the equalizing pulses of group 12 in Figs. 1A and 1B. The gate also responds to the line blanking pulses applied thereto and doubles the frequency thereof so as to be closed during the interval of each of the equalizing pulses of group 12 and for a selected interval immediately thereafter so that bursts of ±(B—Y) carrier are supplied to the transmitter to be impressed on the field blanking pulses to constitute the bursts 16 and 16*a* of Figs. 1A and 1B. Moreover, line synchronizing pulses are supplied to gate 46 so that bursts of (R—Y) carrier may be impressed on the blanking pulses of the television signal as bursts 15 of Figs. 1A and 1B immediately following each line synchronizing pulse during field trace and field retrace intervals.

The transmitter radiates over antenna 33, therefore, a color television signal in which a monochrome video signal (Y) is modulated on a main carrier together with synchronizing information to constitute a standard television signal which may be utilized by present day black and white television receivers. Moreover, color difference signals are disseminated to color television receivers as modulation components of suitable subcarriers, modulators 37 and 38 preferably being of the balanced type so that the subcarrier frequencies are suppressed. Moreover, in order that the color difference signals may be recovered at the receivers, line bursts of signal corresponding in phase and frequency to the (R—Y) subcarrier are transmitted during the line blanking intervals, and field bursts corresponding to the +(B—Y) subcarrier are transmitted during even field-retrace intervals, and field bursts corresponding to the —(B—Y) subcarrier are transmitted during odd field-retrace intervals.

The receiver of Fig. 6 includes a radio-frequency amplifier, first detector, intermediate-frequency amplifier, and second detector designated generally as 50, the input terminal of the radio-frequency amplifier portion of unit 50 being connected to a suitable antenna 51, 52. Unit 50 is connected through a low-pass filter 53 to the control electrodes 54, 55 and 56 of cathode-ray image-reproducers 57, 58 and 59, respectively. Reproducer 57 is utilized to recover the red image, reproducer 58 is used to reproduce the green image and reproducer 59 is used to synthesize the blue image. It is apparent that the image reproducers may be combined, in accordance with established practice, in a single reproducing device.

Unit 50 is also connected to a synchronizing signal separator 60 which, in turn, is connected to a field-sweep system 61 and line-sweep system 62, the sweep systems being respectively coupled to the beam-deflection elements of reproducers 57–59. Line-sweep system 62 supplies line-blanking pulses to gate 20 and field-sweep system 61 supplies field-blanking pulses to gate 22. As previously mentioned, gate 20 is connected to continuous wave restorer 21, and gate 22 is connected through synchronous detector 23 to multi-vibrator 24. The output terminals of low pass filter 53 are connected to a band pass filter 64 which, in turn, is connected to a ±(R—Y) demodulator 65 and to a (B—Y) signal demodulator 66. The output terminals of demodulators 65 and 66 are connected respectively through low pass filters 67 and 68 to the cathodes 69 and 70 of reproducers 57 and 59. The output terminals of filters 67 and 68 are connected to a mixer inverter 71 which, in turn, is connected to the cathode 72 of reproducer 58.

In the manner described in conjunction with Fig. 2, continuous-wave restorer 21 develops a reference subcarrier corresponding to the (B—Y) subcarrier, whereas multi-vibrator 24 produces a sub-carrier corresponding to the +(R—Y) subcarrier during even fields and to the —(R—Y) subcarrier during odd fields.

The color difference subcarrier modulation components are supplied to demodulators 65 and 66 from filter 64. The (R—Y) color difference signal is obtained from demodulator 65, since the subcarrier from multi-vibrator 24 applied thereto has the proper phase and frequency from field to field to perform the demodulating function. Likewise the (B—Y) color difference signal is recovered at demodulator 66 since the reference subcarrier from restorer 21 has the proper frequency and phase to demodulate the (B—Y) modulation components. The (R—Y) color difference signal is supplied to cathode 69 through low-pass filters 67 after undergoing a phase inversion so that the electron beam in reproducer 57 is modulated in accordance with the (R) video signal. Likewise, the (B—Y) color difference signal from demodulator 66 is supplied to cathode 70 of reproducer 59 through low-pass filter 68 after undergoing a phase inversion so that the electron beam in the latter reproducer is modulated in accordance with the B video signal. The color difference signals from filters 67 and 68 are mixed in inverter 71 in well-known fashion to produce the (G—Y) color difference signal of appropriate phase so that the electron beams in reproducer 58 is modulated in accordance with the G video signal. In the aforedescribed manner, the color television receiver may reproduce in natural colors the scene televised from the transmitter of Fig. 3.

In Figs. 1A and 1B the field bursts 16 and 16*a* are shown as impressed in the spaces between the equalizing pulses of group 12 immediately preceding each equalizing pulse in the group. Although the bursts are shown pedestalled on the field blanking pulse so as to be in the infra black region, they may be impressed at any other level in the blanking pulse without impairing their function except that they may cause disturbance in receivers not equipped with field-retrace blanking. When the bursts have an amplitude equal to that of the synchronizing pulses, it has been found that four 3.9 megacycle bursts of 80 periods each are all that are required for optimum efficiency under normal noise conditions, although 5 such bursts are shown in Figs. 1A and 1B. The use of 4 such bursts is shown in Figs. 7A and 7B. In the latter wave form the bursts are shifted so that the first burst of each group occurs a full line trace interval after the termination of the serrated field synchronizing pulse 11. This eliminates any possibility of the field bursts interfering with the operation of a receiver utilizing the field synchronizing pulses to achieve a field identifying signal for the color phase alternation multivibrator, as is the practice in existing systems as previously noted.

The present invention provides, therefore, an improved color television system in which color difference signal synchronizing information is distributed during line-retrace intervals and during field-retrace intervals, and which information is utilized by relatively simple circuits and instrumentalities to provide precisely and accurately synchronized demodulating signals for the color difference modulation components in the television signal.

While a particular embodiment of the invention has been shown and described, modifications may be made, and it is intended in the appended claims to cover all such modifications as fall within the true spirit and scope of the invention.

I claim:

1. A color television receiver for utilizing a color television signal which includes line and field blanking pulses with a first series of signal bursts respectively impressed on the line blanking pulses and a second series of signal bursts respectively impressed on the field blanking pulses, the bursts of the first series having the same frequency as the bursts of the second series and being in phase quadrature therewith and the bursts of the second series being in phase opposition on successive ones of the field blanking pulses, said receiver including in combination, a first gate circuit for selecting the first series of bursts, a continuous wave restorer circuit coupled to said first gate circuit for utilizing the selected bursts to produce a first continuous wave having the same frequency as such selected bursts and a selected phase relation therewith, a second gate circuit for selecting the second series of bursts, a synchronous detector coupled to said second gate circuit and to said restorer and responsive to the first continuous wave and to the selected second series of bursts for producing a control signal varying in amplitude at times corresponding to the times of occurrence of the field blanking pulses, and a control circuit coupled to said detector and to said restorer for utilizing the first continuous wave and the control signal to produce a second continuous wave in phase quadrature with the first continuous wave and having its phase inverted at times corresponding to the times of occurrence of the field blanking pulses.

2. A color television receiver for utilizing a color television signal which includes line and field blanking pulses with a first series of signal bursts respectively impressed on the line blanking pulses and a second series of signal bursts respectively impressed on the field blanking pulses, the bursts of the first series having the same frequency as the bursts of the second series and being in phase quadrature therewith and the bursts of the second series being in phase opposition on successive ones of the field blanking pulses, said receiver including in combination, first gating means for selecting the first series of bursts, restorer means coupled to said first gating means for utilizing the selected bursts to produce a pair of opposite phase components of a first continuous wave having the same frequency as such selected bursts and a selected phase relation therewith, second gating means for selecting the second series of bursts, detector means coupled to said second gating means and to said restorer means and responsive to one of said components of the first continuous wave and to the selected second series of bursts for producing a control signal varying in amplitude at times corresponding to the times of occurrence of the field blanking pulses, and multivibrator means coupled to said restorer means and to said detector means for utilizing said opposite phase components of the first continuous wave and the control signal to produce a second continuous wave in phase quadrature with the first continuous wave and having its phase inverted at times corresponding to the times of occurrence of the field blanking pulses.

3. A color television system for utilizing a color television signal including line signal bursts impressed on line blanking pulses for establishing a reference color subcarrier, and for utilizing field signal bursts impressed on field blanking pulses, said field bursts having the same frequency as the line bursts but in phase quadrature therewith and having phase which is inverted at the end of each field of the television signal, said system including in combination, first gating means for selecting the aforesaid line bursts, a continuous wave restorer circuit coupled to said gating means for utilizing the selected line bursts to develop a reference color subcarrier wave of the same frequency as said line bursts but in phase quadrature therewith, second gating means for selecting the aforesaid field bursts, a synchronous detector circuit coupled to said restorer circuit and to said second gating means for comparing said reference color subcarrier with the selected field bursts to derive a control signal having an amplitude variation at the end of each field of the aforesaid television signal, and a control circuit coupled to said synchronous detector and to said restorer for utilizing said control signal and said reference color subcarrier to develop a second color subcarrier wave in phase quadrature with said reference subcarrier and whose phase is inverted at the end of each field of the aforesaid television signal.

4. A color television system for utilizing a color television signal including line signal bursts impressed on line blanking pulses for establishing a reference color subcarrier, and for utilizing field signal bursts impressed on field blanking pulses, said field bursts having the same frequency as the line bursts but in phase quadrature therewith and having a phase which is inverted at the end of each field of the television signal, said system including in combination, a first gating circuit for selecting the aforesaid line bursts, a continuous wave restorer circuit coupled to said first gating circuit for utilizing the selected line bursts to develop a pair of opposite phase components of a reference subcarrier wave of the same frequency as said line bursts but in phase quadrature therewith, a second gating circuit for selecting the aforesaid field bursts, a detector circuit coupled to said restorer circuit and to said second gating circuit for comparing one of said components of said reference color subcarrier with the selected field bursts to derive a control signal having an amplitude variation at the end of each field of the aforesaid television signal, and a multivibrator circuit coupled to said detector and to said restorer for utilizing said control signal and said opposite phase components of said reference color subcarrier to develop a second color subcarrier wave in phase quadrature with said reference subcarrier and whose phase is inverted at the end of each field of the aforesaid television signal.

5. A color television system including in combination, apparatus for producing a television signal including a series of spaced line blanking pulses each having a line synchronizing pulse impressed thereon and a series of interspersed field blanking pulses each having a field synchronizing pulse followed by a group of spaced equalizer pulses impressed thereon, a generator for producing a carrier wave of selected frequency, a gate circuit coupled to said generator, means for impressing field pulses and line pulses on said gate circuit to cause said gate to derive a series of spaced field signal bursts of the selected frequency of said carrier and of a selected phase relative thereto occurring during time intervals corresponding to the time intervals between successive ones of said equalizer pulses, means for impressing said field signal bursts on each of sad field blanking pulses, a phase inverter circuit coupled to said gate circuit, means for impressing field pulses on said phase inverting circuit to invert the phase of said field signal bursts from one field blanking pulse to another, a second gate circuit coupled to said generator, means for impressing line pulses on said second gate circuit to cause said second gate to derive from said carrier wave a series of line signal bursts of the selected frequency of said carrier and in phase quadrature with said field signal bursts and occurring during time intervals immediately following the intervals of said line synchronizing pulses, and means for impressing said line signal bursts on respective ones of said line blanking pulses.

6. A color television system comprising a transmitter and at least one receiver, said transmitter including in combination, apparatus for producing a television signal including a series of spaced line blanking pulses each having a line synchronizing pulse impressed thereon and a series of interspersed field blanking pulses each having a field synchronizing pulse followed by a group of spaced equalizer pulses impressed thereon, a generator for producing a carrier wave of selected frequency, a circuit coupled to said generator for deriving from said carrier wave a series of line signal bursts of the selected frequency of said carrier and of a selected phase relative thereto, and occurring during time intervals immediately following the intervals of said line synchronizing pulses, means for impressing said line signal bursts on respective ones of said line blanking pulses, a further circuit coupled to said generator for deriving from said carrier wave a series of spaced field signal bursts of the selected frequency of said carrier and in phase quadrature with said line signal bursts and occurring during time intervals corresponding to the time intervals between successive ones of said equalizer pulses, means for impressing said field signal bursts on each of said field blanking pulses, and means for inverting the phase of said field signal bursts from one field blanking pulse to another; said receiver including in combination, a first gate circuit actuated by line pulses for selecting the aforesaid line signal bursts, a continuous wave restorer circuit coupled to said first gate circuit for utilizing the selected line signal bursts to develop a reference color subcarrier wave, a second gate circuit actuated by field pulses for selecting the aforesaid field signal bursts, and a control circuit coupled to said restorer circuit and to said second gate circuit for utilizing said reference subcarrier wave and the selected field bursts to develop a second color subcarrier wave in phase quadrature with said reference subcarrier and whose phase is inverted at the end of each field of the aforesaid television signal.

References Cited in the file of this patent

UNITED STATES PATENTS

| | | |
|---|---|---|
| 2,378,746 | Beers | June 19, 1945 |
| 2,492,926 | Valensi | Dec. 27, 1949 |
| 2,558,489 | Kalfaian | June 26, 1951 |
| 2,594,380 | Barton | Apr. 29, 1952 |
| 2,653,187 | Luck | Sept. 22, 1953 |